United States Patent
Lim et al.

(10) Patent No.: US 7,035,636 B1
(45) Date of Patent: Apr. 25, 2006

(54) SYSTEM AND METHOD FOR CONTROLLING PACKET DATA SERVICE IN MOBILE COMMUNICATION NETWORK

(75) Inventors: Byung Keun Lim, Kyonggi-do (KR); Young Sik Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 645 days.

(21) Appl. No.: 09/475,186

(22) Filed: Dec. 30, 1999

(30) Foreign Application Priority Data

Apr. 20, 1999 (KR) .............................. 1999/14077

(51) Int. Cl.
  *H04Q 7/20* (2006.01)
(52) U.S. Cl. .................. 455/433; 455/428; 455/435.2; 370/342
(58) Field of Classification Search ................ 455/422, 455/436, 432, 435, 428, 433, 422.1, 432.1, 455/432.2, 432.3, 435.1–435.3, 466; 370/342
See application file for complete search history.

(56) References Cited

U.S. PATENT DOCUMENTS

| | | | | |
|---|---|---|---|---|
| 5,325,419 A | * | 6/1994 | Connolly et al. ............. | 379/60 |
| 5,790,952 A | * | 8/1998 | Seazholtz et al. ........... | 455/432 |
| 5,845,211 A | * | 12/1998 | Roach, Jr. ................... | 455/436 |
| 6,240,083 B1 | * | 5/2001 | Wright et al. ............... | 370/348 |
| 6,292,667 B1 | * | 9/2001 | Wallentin et al. ........... | 455/458 |

OTHER PUBLICATIONS

Newton's Telecom Dictionary, 1996, Flatiron Publishing, p. 696.*

* cited by examiner

*Primary Examiner*—Edan Orgad
(74) *Attorney, Agent, or Firm*—Fleshner & Kim, LLP

(57) ABSTRACT

A system and method is provided for controlling a packet data service in a mobile communication network, in which, when a packet data service active terminal moves from an area of an old radio network controller to an area of a new radio network controller in either a suspended state or a dormant state, the same medium access control state information and the same radio resource control information are applied between the new radio network controller and the active terminal. Therefore, the packet data service can rapidly be resumed on the basis of an initially established point-to-point protocol link. If the active terminal moves from the old radio network controller to the new radio network controller under the condition that only a point-to-point protocol state is maintained between the active terminal and a packet data node, the active terminal detects a received pilot signal and checks a system overhead message. If the active terminal should perform a handoff operation in the suspended state, the active terminal requests the old radio network controller to permit its change to the dormant state or an active state.

20 Claims, 2 Drawing Sheets

SYSTEM AND METHOD FOR CONTROLLING PACKET DATA SERVICE IN MOBILE COMMUNICATION NETWORK

BACKGROUND OF THE INVENTION

1. Field of the Invention

The present invention relates to a communication network, and more particularly to a system and method for controlling a packet data service in a mobile communication network.

2. Background of the Related Art

In a related art IMT-2000/PCS/cellular mobile telephone system, a medium access control (hereafter MAC) layer is located between a terminal and a base station system to effectively transfer packet data therebetween. A packet data service active terminal and a base station system interact to maintain four states of such a MAC layer, as shown in FIG. 1, according to the presence of data to be transferred. But, there is no MAC state under a packet data service inactive condition. The four MAC states are as follows.

The first MAC state is an active state where a traffic channel is assigned between a terminal and a base station to transfer packet data therebetween. In the active state, a power control operation is performed through a power control channel, and the packet data is transferred through the traffic channel under control of a radio link protocol (RLP) established between the terminal and a base station system.

The second MAC state is a control hold state where the traffic channel is released because no data is transferred between the terminal and the base station. In the control hold state, however, the power control channel and a radio resource control channel are assigned and a state of the RLP is maintained. In the control hold state, upon the occurrence of data to be transferred, the packet transfer is immediately performed by assigning only the traffic channel.

The third MAC state is a suspended state where the power control channel and the radio resource control channel that were held at the control hold state are released. In the suspended state, however, the RLP state and a state of a point-to-point protocol (PPP) are maintained between the terminal and the base station system. In the suspended state, upon the occurrence of data to be transferred, the packet transfer between the terminal and the base station system is rapidly resumed because the RLP state is maintained.

The fourth MAC state is a dormant state where a radio connection between the terminal and the base station system is completely released and only the PPP state is maintained between the terminal and a packet data node. In the dormant state, the substantially same amount of time as that in initial packet connection is required to resume the packet connection between the terminal and to base station system.

The MAC layer is located between the terminal and the base station system, and more particularly, between a radio network controller (RNC) of the base station system and the terminal to transfer the packet data therebetween on the radio side. When the terminal is under a packet data service active condition, the MAC layer maintains any one of the above four states. Such a MAC state is continuously maintained until the terminal is changed from the packet data service active condition to a packet data service inactive condition (for example, power off). At this time, the same MAC state should be maintained between the radio network controller and terminal. However, control information is required and must be present between the terminal and radio network controller to maintain the MAC state therebetween.

However, techniques associated with the MAC layer between the terminal and base station system are valid only when the MAC state is continuously maintained between the terminal and a new radio network controller even when the terminal moves from an area of an old radio network controller, from which it is currently receiving a packet data service, to an area of the new radio network controller. For this reason, in the case of handoff, the old radio network controller has to transfer all MAC state information of the terminal to the new radio network controller.

As described above, the related art system has various disadvantages. In the related art system, a handoff operation can be performed between the old and new radio network controllers only in the active state and the control hold state among the above-mentioned MAC states. Thus, the handoff operation cannot be executed at either the suspended state or the dormant state. As a result, there is a need to transfer MAC state information between the old and new radio network controllers.

The above references are incorporated by reference herein where appropriate for appropriate teachings of additional or alternative details, features and/or technical background.

SUMMARY OF THE INVENTION

An object of the present invention is to provide a system and method for controlling a packet data service in a mobile communication network that substantially obviates one or more problems caused by disadvantages of the related art and to provide at least the advantages described hereinafter.

Another object of the present invention to provide a system and method for controlling a packet data service in a mobile communication network, in which, in an IMT-2000/PCS/cellular mobile telephone system, when a packet data service active terminal moves from an area of a first radio network controller to an area of a second, new radio network controller under the condition that it is at either a suspended state or a dormant state, the same medium access control (MAC) state information and the same radio resource control information are provided between the new radio network controller and terminal, so that the packet data service can rapidly be resumed on the basis of an initially established point-to-point protocol link.

Another object of the present invention is to provide a system and method for controlling a communication network in which, when a packet data service active terminal moves from an area of an old radio network controller, to which it is currently being connected, to an area of a new radio network controller under the condition that the terminal has no dedicated traffic channel with an associated base station and is in a suspended state of maintaining a radio link protocol state with a base station system, information regarding the radio link protocol state and radio resource control information of the terminal are transferred to the new radio network controller to maintain an initially established point-to-point protocol link.

In accordance with one aspect of the present invention, at least the above and other objects can be accomplished in a whole or in parts by a provision of a system for controlling packet data service in a mobile communication network according to the present invention that includes a plurality of radio network controllers, where each of the radio network controllers assigns a radio channel to a packet data service active terminal and controls a data service path for the active terminal and a location management unit that manages service state information, location information and connection information of the active terminal, where when the active terminal moves from a first one of the radio network controllers to a second one of the radio network controllers in a suspended state or a dormant state, medium access control layer state information and radio resource control information of the active terminal are maintained between the first and second radio network controllers under control of the location management unit.

In accordance with another aspect of the present invention, at least the above and other objects can be accomplished in a whole or in parts by a provision of a method of operating a mobile communication network according to the present invention that includes moving a packet data service active terminal from an old one of the radio network controllers to a new one of the radio network controllers in at least one of a suspended medium access control (MAC) layer state and a dormant MAC layer state, transferring MAC layer state information and radio resource control information of the active terminal from the old radio network controller to the new radio network controller through a location management function entity, and maintaining the MAC layer state information and radio resource control information of the active terminal between the old and new radio network controllers.

In accordance with another aspect of the present invention, at least the above and other objects can be accomplished in a whole or in parts by a provision of a method for controlling a packet data service in a mobile communication network of a radio communication network that includes a plurality of radio network controllers, at least one location management function device and a packet data node to provide a radio packet data service, which includes allowing a packet data service active terminal to move from a current one of the radio network controllers to a target one of the radio network controllers under the condition that only a point-to-point protocol state is maintained between the active terminal and the packet data node, allowing the active terminal to detect a received pilot signal and check a system overhead message, allowing the active terminal to determine whether to perform a handoff operation in a suspended state, and allowing the active terminal to request the current radio network controller to permit its change to one of a dormant state and an active state when the determination is that the active terminal is to perform the handoff operation in the suspended state.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
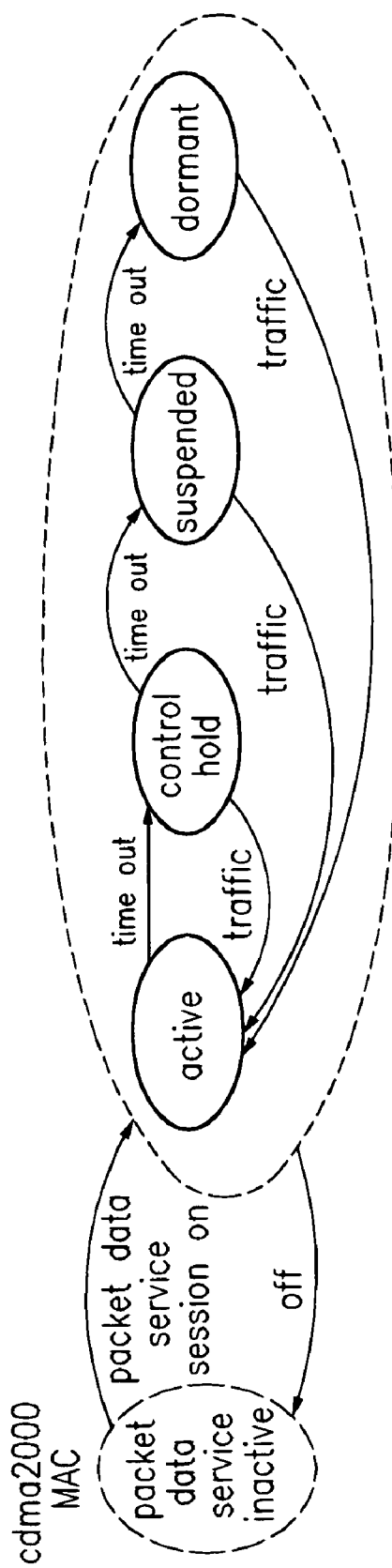
FIG. 1 is a diagram illustrating state transitions of a MAC layer between a terminal and base station system in a related art mobile communication network.
Figure 2:
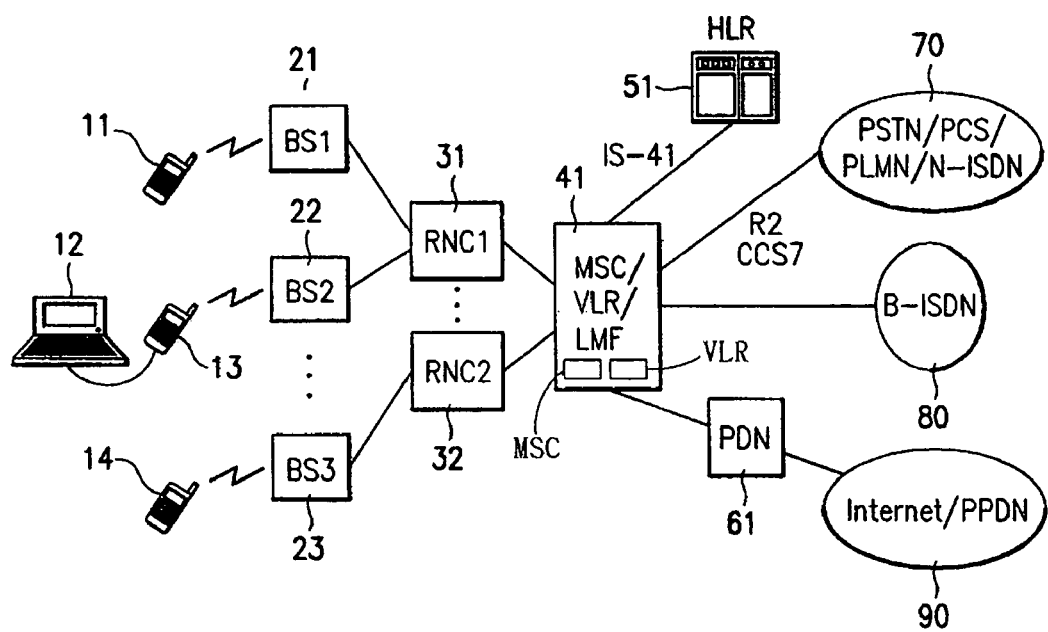
FIG. 2 is a schematic block diagram that illustrates a preferred embodiment of a system for controlling a packet data service in a mobile communication network in accordance with the present invention.

FIG. 2 is a schematic block diagram that illustrates a first preferred embodiment of a system for controlling a packet data service in a mobile communication network in accordance with the present invention. With reference to FIG. 2, the packet data service control system includes a plurality of radio network controllers (RNCs) 31 and 32. Each of the RNCs 31 and 32 are adapted to assign a radio channel to a packet data service active one of a plurality of terminals 11–14 registered to a mobile switching center (MSC) and control a data service path for the active terminal. A plurality of base stations (e.g., BS1, BS2, . . . , BS3) can be correspondingly coupled between the RNCs (e.g., 31, 32) or MSC and the terminals (e.g., 11–14). A packet data node (PDN) 61 is adapted to maintain a point-to-point protocol (PPP) link with the active terminal through a serving one of the RNCs 31 and 32 to process an incoming signal or an outgoing signal to or from the active terminal. A location management function (LMF) entity 41 is adapted to manage service state information and location information of the active terminal and connection information between the active terminal and the packet data node 61, which maintains the PPP link with the active terminal. A home location register (HLR) 51 is coupled to the location management function entity 41 for storing identifiers of all the terminals 11–14 registered to the mobile switching center (MSC) and managing registration information of the terminals 11–14. The location management function entity 41 is provided in the same area of the packet data service control system together with the mobile switching center or a visitor location register (VLR). The LMF 41 can also be provided within the MSC or VLR. Alternatively, a packet control function (PCF) entity may be provided instead of the location management function entity 41. The packet control function entity is adapted to assign packet paths to radio packet data and establish a virtual circuit between the serving radio network controller and a target one of the radio network controllers 31 and 32 or between the serving radio network controller and the packet data node 61.

A PSTN/PCS/PLMN/N-ISDN 70 and B-ISDN 80 are coupled to the mobile switching center/visitor location register/location management function entity 41, and an Internet/PPDN 90 is coupled to the packet data node 61.

The first preferred embodiment of the packet data service control system with the above-described architecture in accordance with the present invention handles a case when the packet data service active terminal moves from an area covered by an old radio network controller (for example, RNC 31) to an area covered by a new radio network controller (for example, RNC 32). According to the first preferred embodiment of the packet data service control system, the old radio network controller 31 maintains the same protocol link layer state between the active terminal and new radio network controller 32 and provides handoff information to the new radio network controller 32, under control of the location management function entity 41. In other words, when the packet data service active terminal moves from the old radio network controller (hereafter "old RNC") to the new radio network controller (hereafter "new RNC") in a suspended state or a dormant state, MAC layer state information and radio resource control information of the active terminal maintained between the active terminal and the old RNC are equally maintained between the active terminal and the new RNC.

To implement the first preferred embodiment of the packet data service control system according to the present invention, first, the location management function entity 41 must be provided in the area of the mobile switching center/visitor location register and coupled to a plurality of RNCs. The location management function entity 41 manages dynamic service state information and location information of the packet data service active terminal and connection information between the active terminal and the packet data node 61, which maintains the PPP link with the active terminal.

Second, when the packet data service active terminal is at either the suspended state or the dormant state, the same radio link protocol state should be maintained between the active terminal and the serving RNC. If the active terminal moves from the serving RNC, or old RNC, to the new RNC, it is impossible for the old RNC to directly transfer radio link protocol (RLP) state information and terminal radio resource control information to the new RNC since there is no substantial handoff between the old and new RNCs. Accordingly, in the first preferred embodiment of the packet data service control system, the radio link protocol state information and terminal radio resource control information are transferred to the new RNC under control of the location management function entity 41.

On the other hand, a considerably larger amount of data is present in the suspended state of the packet data service active terminal relative to the data in the dormant state of the active terminal because MAC state information of the terminal to be transferred to the new RNC includes the radio link protocol (RLP) state information and the terminal radio resource control information in the suspended state of the terminal. In this regard, it is preferable or not efficient to transfer the MAC state information of the terminal to the new RNC under control of the location management function entity 41. Therefore, two exemplary system approaches according to the first preferred embodiment will now be described to effectively transfer the MAC state information of the terminal to the new RNC. However, the present invention is not intended to be so limited.

In the first exemplary approach, when the packet data service active terminal is in the suspended state, it detects a received pilot signal and checks a system overhead message to determine whether to perform an idle handoff operation. If the active terminal has to perform the idle handoff operation, the active terminal requests the serving RNC 31 to permit its change to the dormant state. When the serving RNC 31 permits the dormant state change, the active terminal moves from the serving or old RNC 31 to the new RNC 32. Accordingly, a reduced amount of information can be transferred to the new RNC 32 under control of the location management function entity 41.

In the second exemplary approach, when the packet data service active terminal is in the suspended state, it detects a received pilot signal and checks a system overhead message to determine whether to perform the idle handoff operation. If the active terminal has to perform the idle handoff operation, the active terminal requests the old RNC 31 to permit its change to the active state. When the old RNC 31 permits the active state change, the terminal performs a soft handoff operation between the old and new RNCs at the active state. As a result, the same MAC state information is maintained between the terminal and a new RNC without being under the control of the location management function entity 41.

Operations of the packet data service control system in accordance with the first preferred embodiment of the present invention will now be described with reference to FIG. 2. As shown in FIG. 2, when no data is transferred between each of the terminals 11–14 and each of the RNCs 31 and 32, a traffic channel is released therebetween for the efficient use of radio resources by the network. Then, upon the occurrence of data to be transferred, the traffic channel is re-established between the terminal and RNC.

To re-establish the traffic channel, particularly after its complete release, extreme connection power must be used because of initialization according to a location change of the terminal, and in addition, time is lost or wasted during the RLP re-establishment.

However, if a packet data service active terminal, for example, active terminal 13 moves from the pre-connected old RNC 31 to the new RNC 32 while either in the suspended state or the dormant state, MAC state information must be transferred to the new RNC 32 so that a MAC state of the terminal can become the same as that of the old RNC 31. As a result, the terminal or base station system can try to re-establish connection without any particular problem to use a radio resource like in initialization. Namely, if the active terminal 13 moves from the old RNC 31 to the new RNC 32, the location management function entity 41 transfers MAC layer associated information, radio resource control information and packet routing information of the terminal 13 managed by the old RNC 31 to the new RNC 32 while maintaining information based on the location movement of the terminal 13.

At this time, if the active terminal 13 is at the suspended state, the terminal 13 detects a pilot signal received from the base station system and monitors a system overhead by checking a system overhead message to determine whether to perform the idle handoff operation. If the terminal 13 should perform the idle handoff operation, the terminal 13 requests the old RNC 31 to permit changing to the dormant state or the active state as preferable according to a given situation or current conditions of the network.

In an idle handoff operation, the same MAC layer state information is maintained between the active terminal and new RNC 32 under a support of the location management function entity 41. But, in the an active hard handoff operation, the radio link protocol state information and the radio resource control information are transferred to the new RNC (e.g., RNC 32) without support of the location management function entity 41.

As described above, a first preferred embodiment of a packet data service control system and method of the present invention have various advantages. When a packet data service active terminal moves from an area of an old radio network controller to an area of a new radio network controller under the condition that it is at either a suspended state or a dormant state where an active handoff operation cannot be executed according to the first preferred embodiment of a packet data service control system and method, the same medium access control (MAC) state information and the same radio resource control information are maintained between the new radio network controller and terminal, and packet data node routing information is transferred to the new radio network controller. Therefore, the packet data service can rapidly be resumed on the basis of an initially established point-to-point protocol link.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A system for controlling a packet data service in a mobile communication network, comprising:
a plurality of radio network controllers, wherein each of said radio network controllers assigns a radio channel to a packet data service active terminal and controls a data service path for said active terminal; and
a location management unit that manages service state information, location information and connection information of said active terminal;
wherein, when said active terminal moves from a first one of said radio network controllers to a second one of said radio network controllers in a suspended state or a dormant state, medium access control layer state information and radio resource control information of said active terminal are maintained between said first and second radio network controllers under control of said location management unit.

2. The system of claim 1, further comprising a packet data node for maintaining a point-to-point protocol link with said active terminal through a serving one of said radio network controllers to process one of an incoming signal from said active terminal and an outgoing signal to said active terminal.

3. The system of claim 2, wherein said second radio network controller is adapted to receive packet data node routing information from said first radio network controller and transfer a node link message to said packet data node to notify the packet data node that said active terminal has moved to said second radio network controller.

4. The system of claim 1, further comprising a mobile switching center and a visitor location register, wherein said location management is provided to said mobile switching center and visitor location register.

5. The system of claim 4, further comprising a packet control function entity adapted to establish a virtual circuit between a serving one of said radio network controllers and one of a target one of said radio network controllers and a packet data node, wherein said packet control function entity is provided said mobile switching center and visitor location register.

6. The system of claim 1, wherein said suspended state is a state where a traffic channel, a power control channel and a radio resource control channel are released between said active terminal and a serving one of said radio network controllers, and wherein a radio link protocol state and a point-to-point protocol state are maintained between said active terminal and said serving radio network controller; and
wherein said dormant state is a state where a radio connection is released between said active terminal and said serving radio network controller and only said point-to-point protocol state is maintained between said active terminal and a packet data node.

7. The system of claim 1, wherein said mobile communication network is an IMT-2000/PCS/cellular communication network.

8. In a radio communication network that includes a plurality of radio network controllers, a method for operating a mobile communication network, comprising:
a) moving a packet data service active terminal from an old one of said radio network controllers to a new one of said radio network controllers in at least one of a suspended medium access control (MAC) layer state and a dormant MAC layer state;
b) transferring MAC layer state information and radio resource control information of said active terminal from said old radio network controller to said new radio network controller through a location management function entity; and
c) maintaining said MAC layer state information and radio resource control information of said active terminal between said old and new radio network controllers.

9. The method of claim 8, wherein the location management device is in a mobile switching center and provides radio packet data service.

10. A method for controlling a packet data service in a mobile communication network of a radio communication network that includes a plurality of radio network controllers, at least one location management function device and a packet data node to provide a radio packet data service, the method comprising:
a) allowing a packet data service active terminal to move from a current one of said radio network controllers to a target one of said radio network controllers under the condition that only a point-to-point protocol state is maintained between said active terminal and said packet data node;
b) allowing said active terminal to detect a received pilot signal and check a system overhead message;
c) allowing said active terminal to determine whether to perform a handoff operation at a suspended state; and
d) allowing said active terminal to request said current radio network controller to permit its change to one of a dormant state and an active state when the determination is that said active terminal is to perform the handoff operation in said suspended state.

11. The method of claim 10, further comprising the step of allowing said current radio network controller to transfer radio link protocol state information and radio resource control information of said active terminal to said target radio network controller under control of said location management function entity if said active terminal is changed to said dormant state.

12. The method of claim 10, wherein when said active terminal is changed to said dormant state, the method further comprises allowing said location management function entity to transfer an overhead message to said target radio network controller to notify the target radio network controller that an inter-radio network controller handoff operation is executed.

13. The method of claim 12, wherein when said active terminal is not to perform the handoff operation in said suspended state, the method further comprises the step of allowing said current radio network controller to detect a location of said active terminal and prevent the change to said dormant state.

14. The method of claim 10, wherein the location management function device is in a mobile switching center.

15. The method of claim 10, wherein the mobile communication network is an IMT-2000/PCS/cellular communication network.

16. The system of claim 1, wherein a handoff is initiated from the first radio network controller to the second radio network controller responsive to said movement of said active terminal to control of the second radio network controller in the suspended state or the dormant state.

17. The system of claim 16, wherein the handoff is an inactive handoff from said first radio network controller to the second radio network controller.

18. The system of claim 17, wherein said active terminal in said suspended state is transferred to one of said active state and said dormant state responsive to the location management unit before said inactive handoff.

19. The system of claim 1, wherein a handoff is initiated from the first radio network controller to the second radio network controller responsive to a status change caused by said movement.

20. The method of claim 8, wherein the moving a packet data service active terminal is responsive to a status change caused by movement by the active terminal to an area controlled by said new radio network controller.

* * * * *